July 9, 1940.      G. HUREAU      2,206,867
PROCESS OF DISTILLING LIQUOR
Filed March 28, 1938      2 Sheets-Sheet 2
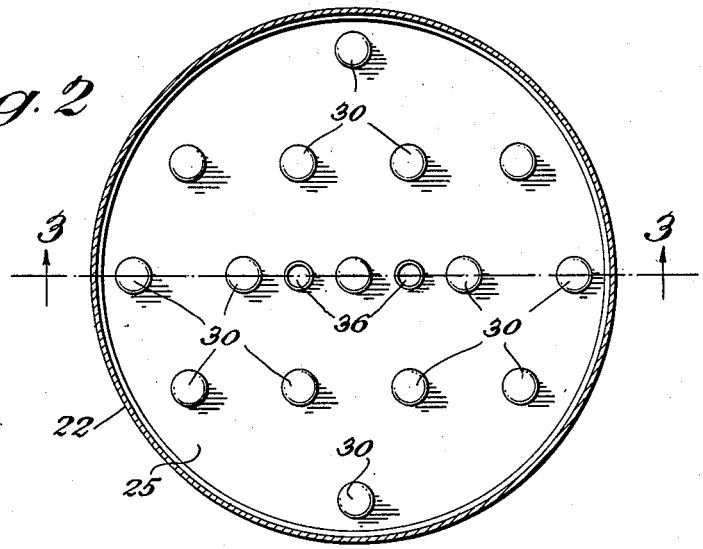
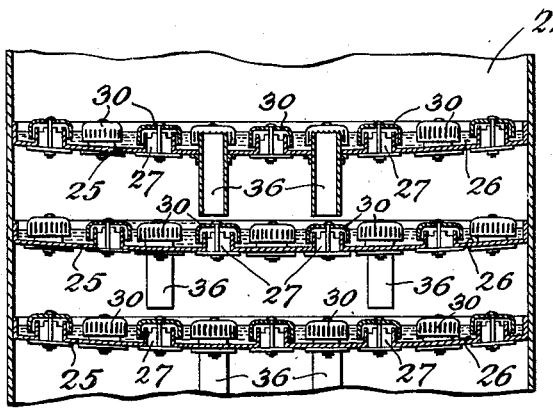
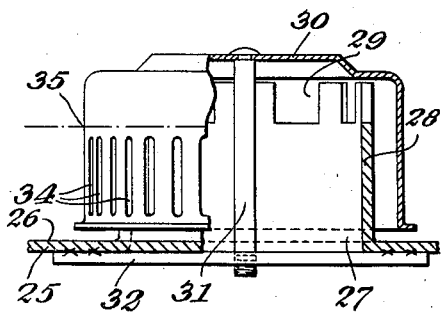
Inventor:
George Hureau
By Dike, Calvert & Gray
Attorneys.

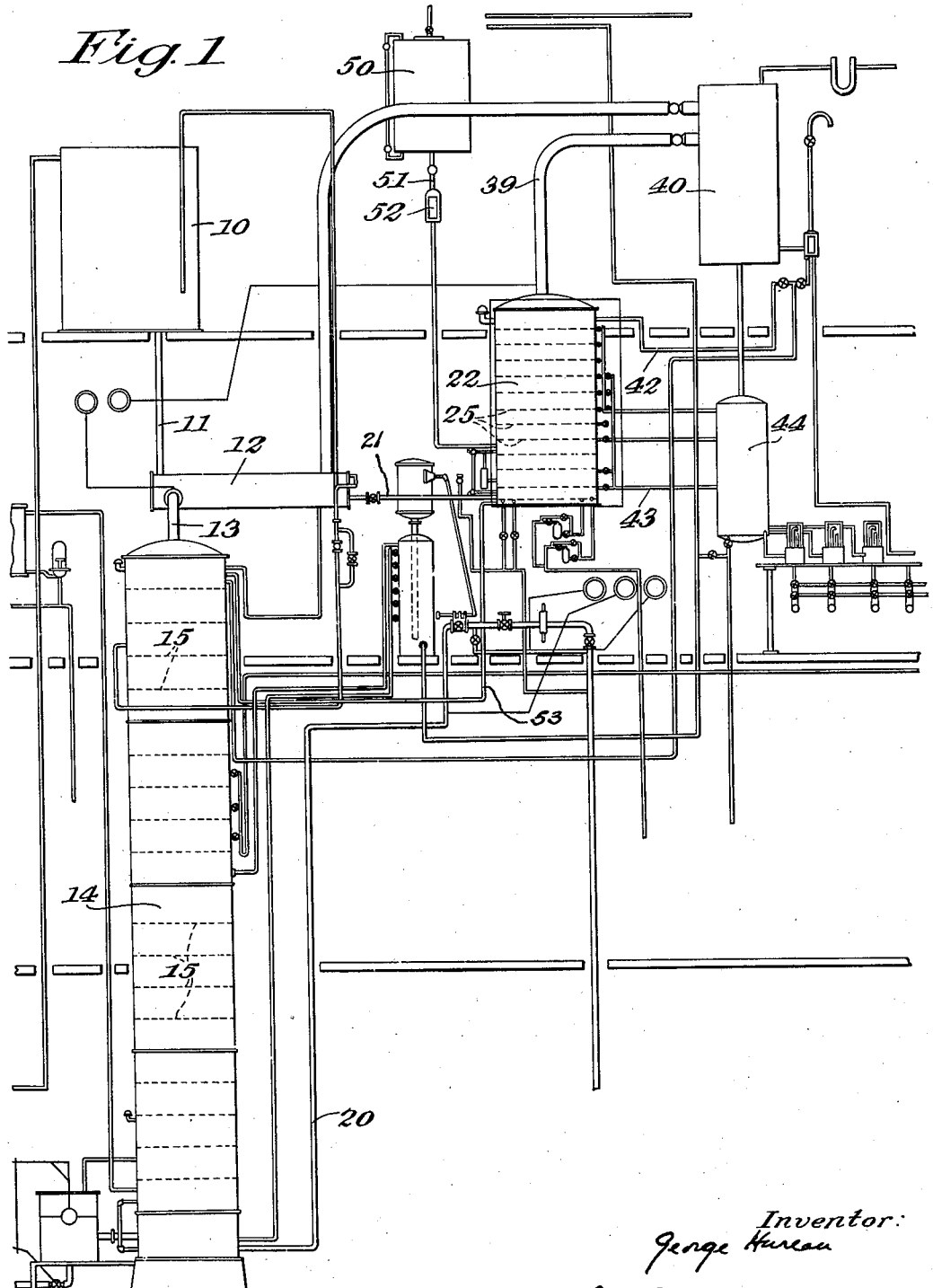

Patented July 9, 1940

2,206,867

UNITED STATES PATENT OFFICE 2,206,867

PROCESS OF DISTILLING LIQUOR

George Hureau, Everett, Mass.

Application March 28, 1938, Serial No. 198,367

4 Claims. (Cl. 99—48)

This invention relates to a process of distilling liquor and particularly to a method of removing the impurities during the distilling process and so reducing the aging period for the distilled liquor.

My process follows the customary method of distilling followed by the industry for a great many years, but in addition utilizes an aqueous solution of copper sulphate and alum in the distilling process, which results in removing many of the impurities from the distillate, imparting smoothness and greatly improved aroma to the liquor and reducing the aging process for a liquor having the qualities of bonded liquor. As described my method is used in distilling New England rum, but it can be used in making other distilled liquors including rye and Bourbon whiskey.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a diagrammatic lay-out of a typical rum distilling apparatus;

Fig. 2 is a plan view of a bubble plate commonly used in the rectifying column of rum distilling apparatus;

Fig. 3 is a vertical section through a rectifying column showing several bubble plates in position;

Fig. 4 is a front elevation partly in section showing a typical bubbling cup.

Referring to the drawings it is to be understood that the apparatus shown therein is a typical apparatus used in distilling New England rum, except for the solution tank and pipes added for carrying out my process. As the usual method and apparatus used in distilling rum is well known in the industry, it need not be described in detail. Referring to Fig. 1, 10 is a beer tank to which the fermented beer is pumped from fermenting tubs (not shown). The beer passes by gravity through pipe 11 into the beer heater 12 where it is preliminarily heated, and thence by pipe 13 passes into the beer still 14 entering preferably on the eighteenth plate 15 of the twenty plate still. The plates 15 are sieved or filled with holes allowing the beer to drip down through them in the usual manner. Steam for heating and vaporizing the beer enters the beer still 14 through steam main 20. The vapors from the heated beer pass up through the plates 15 of the beer still 14, through beer heater 12 and thence into the bottom of the rectifying column 22 through pipe 21, entering preferably below the first or bottom plate 25. In the rectifying column, as is well known, the proof of the alcoholic vapors is built up. Plates 25 are known as bubbling plates and are shown in detail in Figs. 2 and 3. These plates are of the usual construction and are designed to pass the alcoholic vapors through a bath of liquid composed largely of the condensation of the alcoholic vapors from beer. These bubbling plates 25 consist of a large circular pan 26 having a plurality of holes 27 therein permitting passage of the vapors therethrough, and having an upwardly extending lip 28 with notches 29 rising above the liquid level on the plate. A cap 30 is held mounted over lip 28 by means of pin 31 fixed to the bottom sides of plate 26 by means of tie strip 32, said tie strip 32 being welded or riveted to the bottom side of said plate 26 as shown in detail in Fig. 4. Cups 30 have apertures 34 through which the vapors pass and bubble upwardly through the liquid condensate on said plates 25. It will thus be seen that the lips and cup on said plates constitute water seals, preventing the liquid on said plates from passing from one plate to another and causing the vapors to pass downwardly and then upwardly through said liquid. The liquid level is held at point 35 by means of overflow pipes 36 which permits the excess of fluid on any plate 25 above the upper level of lip 28 to flow downwardly onto the next plate below. These vapors, their proof having been built up in the rectifying column, pass then into the condenser 40, through pipe 39, where the vapors are condensed by being cooled as by cold water passing around coils (not shown). This liquid containing a large proportion of alcohol is then passed back into the rectifying column 22 entering at the top through pipe 42 to be drawn off on the second plate from the top through pipe 43 into the cooler 44 and thence into cisterns and barrels not shown.

My process which has been added to the usual distilling process above described utilizes a solution tank 50 into which my solution is passed or mixed. My solution consists of copper sulphate and alum dissolved in an aqueous solution, mixed preferably in the proportion of five pounds of copper sulphate to three pounds of alum, though the exact proportions may be varied. This quantity of chemicals is usually preliminarily mixed in nine gallons of water and is emptied into the solution tank 50 which, as shown, contains 318 gallons of water. This quantity (318 gallons) is sufficient for distilling the contents of one fermenting tub which will contain approximately 13,000 gallons of beer. If desired, a larger quantity of water, such as 600 gallons may be used in distilling this quantity of beer. The contents of one fermenting tub (13,000 gallons) is usually distilled in an eight hour period in one distilling unit.

My solution is passed through pipe 51, sight glass 52, into rectifying column 22 on the third plate from the bottom. The solution slowly entering on the third plate is evenly distributed by a distributor (not shown) then gradually passes down to the lower plates to the bottom of the rectifying column, through overflow pipes 36 on bubbling plates 25, and is then carried off to the top of beer still 14 through pipe 53, entering on the first plate from the top of beer still 14. Here the solution filters down through the sieved plates 15 of beer still 14, mixing with the beer being heated. In rectifying column 22 it will be seen that the vapors are passed through my solution and are washed or filtered thereby, when passing upwardly through holes 27 in bubbling plates 25, and then downwardly through the solution under the lower edge of cap 30 and thence rising upwardly through the solution to the bubbling plate above. In addition, it is possible that the beer in the still 14 at lower proof also contains some of my solution in the liquid form of the beer and possibly in its vapor and may be favorably affected thereby.

The precise chemical reaction taking place in my process is not entirely clear and certain, but the results obtained are definite and positive. It is believed that my solution washes, filters out or neutralizes the aldehydes and other impurities from the alcoholic vapor, rendering them harmless or ineffective in the liquor. The bacteria used in fermentation, which die when fermentation is complete, form into a greasy mass, which is carried through with the alcohol at low proof, and it is believed that this bacterial residue gives the alcohol its mashy odor. The sulphuric acid in the solution apparently breaks down or neutralizes the aldehydes rendering them harmless or permitting them to be washed out in my solution. At any rate, a large part of the mashy odors are removed by my process. In my solution, the copper sulphate, which alone may leave an unpleasant taste or odor in the distillate, is apparently entirely neutralized by the alum. In carrying out my process tests have shown no trace of the copper sulphate or alum in the resulting alcoholic liquor. This breaking down or neutralizing of the aldehydes may also occur to some extent in the still 14, from the quantity of my solution added to the beer herein.

The result of my process, at any rate, is a thoroughly clear distillate from which a great many of the impurities or aldehydes, and much of the mashy odor ordinarily requiring at least two years to be carried off through normal aging, are removed when the liquor comes from the still. The alcoholic liquor which has been passed through my solution as above described comes out of the still having the qualities of a liquor which has been aged two years. This liquor is then allowed to age in charred barrels for approximately two years and the resulting liquor has the smoothness and aroma and flavor of a bonded liquor which has been normally aged approximately four years. It will thus be seen that the normal aging process is at least cut in half by means of my process, and the quality of the liquor obtained in any period of aging is greatly improved.

I claim:

1. In distilling alcoholic liquor the process for removing much of the mashy odor therefrom which consists in passing the vapors of a fermented liquid through and washing them with an aqueous solution of copper sulphate and alum.

2. In distilling alcoholic liquor the process for removing much of the mashy odor therefrom which consists in passing the vapors of a fermented liquid through and washing them with an aqueous solution of copper sulphate and alum introduced into the rectifying column of the distilling apparatus.

3. In distilling alcoholic liquor the process for removing much of the mashy odor therefrom which consists in passing the vapors of a fermented liquid through and washing them with an aqueous solution of copper sulphate and alum in the approximate proportions of five pounds of copper to three pounds of alum.

4. In distilling alcoholic liquor the process for removing much of the mashy odor therefrom which consists in passing the vapors of a fermented liquid through and washing them with an aqueous solution of copper sulphate and alum introduced into the rectifying column and returning the residue of the aqueous solution to the beer still in the distilling apparatus for reclaiming any alcohol absorbed therein during the washing operation.

GEORGE HUREAU.